Patented June 16, 1925.

1,542,006

UNITED STATES PATENT OFFICE.

JOHAN NICOLAAS ADOLF SAUER, OF AMSTERDAM, NETHERLANDS, ASSIGNOR TO NAAMLOOZE VENNOOTSCHAP NORIT WITSUIKER MAATSCHAPPIJ (ALSO CALLED NORIT WHITE SUGAR COMPANY), OF AMSTERDAM, NETHERLANDS, A CORPORATION OF THE NETHERLANDS.

DECOLORIZING CARBON PARTICULARLY FOR MEDICINAL USE.

No Drawing.    Application filed July 26, 1917.   Serial No. 182,883.

*To all whom it may concern:*

Be it known that I, JOHAN NICOLAAS ADOLF SAUER, a subject of the Queen of the Netherlands, and resident of 567 Heerengracht, Amsterdam, Netherlands, have invented certain new and useful Improvements in Decolorizing Carbons Particularly for Medicinal Use, of which the following is a specification.

My present invention relates to a new neutral and sterile decolorizing carbon adapted particularly for sanitary and medicinal uses, such as purifying and sterilizing water, treating wounds, for instance gangrenous ones, and relieving (when taken internally) foul breath and other unpleasant symptoms and conditions, especially of the stomach.

The treatment of impure water with this new product forms the subject-matter of a separate application for a patent filed by me simultaneously herewith, and will therefore not be described in detail in this application.

Decolorizing carbon is a substance usually derived from vegetable material and consisting largely of carbon in an amorphous and therefore highly absorbent condition. Decolorizing carbon is brought on the market in several species and under different names, for instance "Norit", "Eponit" (or "Eponite"), and "Noir Epure" (see U. S. Patents 1,070,654; 1,074,337; 1,176,999; and 1,189,896).

Decolorizing carbon is a general technical name for a special class of carbon with special physical properties and is quite different from ordinary vegetable wood charcoal (woodcarbon or woodchar) or from animal boneblack (animal bonechar), or from blood charcoal, and is much more efficient. Decolorizing carbon is a technically pure amorphous carbon and not a compound of carbon like ordinary wood charcoal. It has a lower specific gravity and a deeper black color than ordinary vegetable wood charcoal. Decolorizing carbon as it is put on the market, contains on 100 dry substance about 90% and more of pure carbon.

A typical high-class decolorizing carbon of the kind now obtainable in the market will contain from 8 to 10% of moisture, while the dry substance which forms the remainder of the decolorizing carbon will consist say of 94% of amorphous carbon and 6% ash, this ash consisting mainly of potassium carbonate, calcium phosphate, calcium carbonate, magnesium carbonate, iron phosphate, iron oxid, soluble silica, sand (insoluble silica), traces of copper oxid, chlorine, sodium oxid, etc.

Some hydrogen (about 1.5%) and oxygen (about 2.5%) and to a very small extent also nitrogen (.1%) is present. These substances (hydrogen, oxygen and nitrogen) have to be considered as impurities, and their presence is caused by the technical difficulty of completely carbonizing the vegetable substances which usually form the raw material for the manufacture of decolorizing carbons.

Inferior decolorizing carbons contain from 18 to 60% of ash. High-class decolorizing carbons, such as Norit, Eponit (or Eponite), and Noir Epure, contain a much smaller proportion of ash.

Substances of animal origin, such as refuse of fish, leather, blood, etc., may also be converted into an amorphous technically pure carbon with a high content of pure carbon, which product will have a great absorptive power and therefore a high decolorizing, purifying, and filtering efficiency. I therefore desire it to be understood that the term "decolorizing carbon" as used in this specification and in the claims, is to be interpreted as including products of animal origin as well as those of vegetable origin.

Furthermore, a mixture of decolorizing carbon with any other material is to be understood as included in, and covered by, the appended claims, for the reason that the addition of other material, if indifferent or beneficial in its action, will not be objectionable. As a rule, there will scarcely be any advantage in adding to the decolorizing carbon, any indifferent material, say kieselguhr, for it adds to the bulk of the mass and does not increase either its decolorizing or its filtering or purifying power, and obviously, the same amount (weight or volume) of unmixed decolorizing carbon will be more efficient than a like amount of a mixture containing decolorizing carbon with an addition of indifferent material. The term "indifferent" as used herein, may be defined as designating any material which has no detrimental action and does not harm the chemical and physical properties of the decolorizing carbon when used in admixture thereto.

The neutral sterile decolorizing carbon required for the purposes of my present invention, may be prepared as follows:

I take any high-class decolorizing carbon (preferably those known commercially as Norit, Eponit (or Eponite), and Noir Epure, and referred to in the U. S. patents mentioned above), and treat any such carbon with a suitable acid, say hydrochloric acid or sulfuric acid, but preferably hydrochloric acid, a 2% solution of this latter acid in water being a suitable one. This should be carried out at a high temperature, preferably at the boiling point of the diluted acid solution. This treatment with acid should not be a mere washing, but a thorough treatment continued for one hour or more, and preferably carried out in wooden vats with wooden stirrers, steam being injected into the acid solution. The amount of acid employed should be in some excess of the amount required to remove the objectionable impurities present in the original decolorizing carbon, and particularly the above-mentioned salts, calcium carbonate, magnesium carbonate, calcium phosphate, potassium carbonate, and also iron oxid and iron salts, which together form the major part of the detrimental impurities or ash contents of the present decolorizing carbon.

In the former patents (referred to above), there is a mention of using hydrochloric acid in the regeneration of spent (used) decolorizing carbon, where the regeneration comprises a treatment with alkalies or alkaline earths preceding the treatment with hydrochloric acid. In these former processes, the manner and purpose of using the hydrochloric acid are quite different from the present case. It is well-known that it takes considerable time to wash away alkalies, and that to reduce the time of washing, certain acids may be employed to neutralize the remaining alkalinity, while then the salts which are formed are easily washed out with water. For this purpose only (neutralization) acid was suggested in these earlier patents.

After the Norit (or other decolorizing agent) has been treated as above set forth, it is filtered off in suitable filters or filter presses, or treated in centrifugal separators or in decanting or subsiding tanks, and washed preferably with hot water to remove practically all the acid and any constituents which are soluble or have become soluble through the action of the acid employed, and to thus bring the decolorizing carbon to a practically neutral condition. This washing can be carried out say by pumping hot water through the filters or filter presses containing the decolorizing carbon, or by repeated decanting with the aid of decanting tanks, or by one or more washings in turbines.

In some cases, the treatment of decolorizing carbon with acid should be preceded by a preliminary treatment consisting of two steps, the first being treatment with alkalies (preferably caustic soda or carbonate of soda), or with reducing agents such as strong sulfuric acid, or with zinc chlorid, or with alkaline earths (such as magnesium chlorid or lime), or with oxidizing chemicals (such as permanganate of potassium, chlorates of sodium and potassium, hypochlorite of lime, potassium or sodium, etc.). The second step consits of a washing operation, preferably with hot water. This preliminary treatment is particularly advisable when the decolorizing carbon contains a relatively large proportion of sulphate of lime, which by boiling say with carbonate of soda is converted into carbonate of lime and sulphate of soda. The following washing with hot water will take away the sulphate of soda, which is soluble. The subsequent treatment with acid, say hydrochloric acid, converts the carbonate of lime into chlorid of lime, and the following washing with hot water will remove the chlorid of lime. In case the decolorizing carbon contains organic matter not carbonized or incompletely carbonized, treatment with caustic soda (or oxidizing chemicals, or with strong sulfuric acid), followed by hot-water washing, will remove these impurities (the subsequent treatment with acid and wash-water removing the remaining alkalinity, if alkalies were used).

The resulting new product (improved decolorizing carbon) may be used either wet or dry for certain industrial purposes (such as the treatment of sugar liquids), as described in other applications for patents which I am filing simultaneously herewith. The product, if dried, will generally still contain a certain percentage of moisture, which however is harmless.

The term "sugar liquids" as employed above, is to be given a broad interpretation, so as to include sugar juices from beets, sugar-cane, or other plants, solutions containing sugar obtained from beets, cane, or other plants, or invert sugar from beets, cane, or other plants, or glucose from corn, potatoes, etc.

The new product differs from the original in three important respects: First, the dry substance contains a much higher percentage of amorphous carbon than the original decolorizing carbon, say from 97 to 99% instead of about 94%. Even a product containing practically 100% of amorphous carbon in the dry substance could be obtained. Second, the new product has the carbon in more absorbent and efficient form because its pores are more open, being free from choking substances. Third, not only is the ash content reduced correspondingly (say, from 6% to only from 1 to 3%), but this ash consists mainly of insoluble silica (sand) and some other substances which are either absolutely inert or at least not detrimental. More particularly, it will be noted that this perfected or refined decolorizing carbon is practically neutral, that is to say, it no longer contains the salts (such as potassium carbonate, magnesium carbonate, and calcium carbonate or phosphate, etc.) which give an alkaline character to the decolorizing carbons employed hitherto, and further, it contains practically no free acid which might lead to the undesirable production of invert sugar, when this improved agent is used for treating sugar liquids.

The ash constituents of the new or improved decolorizing carbon obtained by the treatment just described, may be for instance as follows:

|  | Per cent. |  | Per cent. |
| --- | --- | --- | --- |
| Magnesium oxid (MgO) | .02 |  | .84 |
| Calcium oxid (CaO) | .03 |  | 1.27 |
| Potassium oxid (K$_2$O) | .03 |  | 1.27 |
| Soluble silica (SiO$_2$) | .18 |  | 7.59 |
| Insoluble mineral matter (sand, silica, etc.) | 1.89 |  | 79.76 |
| Phosphoric acid (P$_2$O$_5$) | .07 | or, on 100 ash | 2.95 |
| Sulfuric acid (SO$_3$) | .03 |  | 1.27 |
| Carbonic acid (CO$_2$) | Traces |  | Traces |
| Copper oxid (CuO) | Traces |  | Traces |
| Iron oxid+alum (Fe$_2$O$_3$)+(Al$_2$O$_3$) | Traces |  | Traces |
| Chlorine (Cl$_2$) | Traces |  | Traces |
| Undetermined matter | .12 |  | 5.05 |
|  | 2.37 |  | 100.00 | of the decolorizing carbon (excluding moisture).

The difference between the action of the untreated, alkaline decolorizing carbon existing prior to my invention, and the new, neutral, acid-treated carbon, will also be apparent from the following test:

If 5 grammes of untreated decolorizing carbon are boiled with 100 cubic centimetres of water (or sugar liquor), about .06 gramme of soluble substances of the carbon will be dissolved, that is to say, 1.20%. The matter thus dissolved will consist especially of potassium carbonate and calcium carbonates, phosphates and sulfates, magnesium salts, iron salts, alumina, etc., and imparts an alkaline reaction to the liquid.

If 5 grammes of acid-treated decolorizing carbon are boiled with 100 cubic centimetres of water (or sugar liquid), practically nothing at all (or such small amount that it either cannot be determined or is very difficult to detect) goes into solution.

The product described above (neutral decolorizing carbon), while suitable for certain industrial purposes, as set forth, still lacks one property in order to be suitable for the purposes of the present invention, viz: it is not yet sterile. To give it this additional characteristic, the product is sterilized by any suitable treatment. For instance, it may be burned under exclusion of air, that is to say, it may be subjected to intense heat (say, about 1200° Fahrenheit) in closed retorts; or steam or superheated steam may be caused to act on the neutral decolorizing carbon either directly or indirectly. If the action of steam is direct, the retort containing the decolorizing carbon might be open to the air; if indirect action is employed, the retort is preferably closed (in which case a higher temperature can be attained). This heating under exclusion of air, or with the aid of steam, also drives out of the decolorizing carbon, any traces of acid that may have been adsorbed by it.

After drying, this product forms a very fine powder (sterile neutral decolorizing carbon) which may be applied for the simultaneous purification, filtration, and sterilization of even very impure water, as set forth in my other application referred to above. The product in powder form is also suitable for dressing wounds, absorbing pus from open abcesses, etc. For certain purposes, and particularly for internal use, the neutral sterile decolorizing carbon cannot be employed conveniently in its powdery form, it being so light and fine as to be liable to be inhaled into the lungs and to produce a choking sensation; besides, being intensely black, it is liable to soil or foul the skin, mouth, or articles with which it may come into contact. For use in such cases, therefore, I prepare this product in coherent form (preferably pills or tablets) with the aid of a suitable binder, since without the binder the product cannot be formed into tablets (say by compression). The binder however must not be absorbed by the decolorizing carbon, since in this case the medicinal efficiency of the carbon would be destroyed or at least impaired, by the binder choking up the pores of the decolorizing carbon; furthermore, the binder must be soluble in water (or saliva) or at least in the digestive juices. So far, I have found two binders which will fulfill these requirements, viz.: cane sugar and milk sugar. The incorporation of the decolorizing-carbon powder with such sugar may be effected in any well-known or approved manner, for instance as fololws: I make a solution of cane sugar or milk sugar, which solution should be supersaturated at the particular temperature employed, and into this solution, while hot, I put the decolorizing carbon, the percentage varying according to circumstances; as an example, 10 parts of sugar (by weight) may be used to 100 parts of decolorizing carbon. The solution is allowed to cool and crystallize, and the sugar crystals will form a binder for the particles of decolorizing carbon, and hold the mass together. The forming into pills, tablets, or other coherent shapes is accomplished preferably by molding or similar processes performed while the mass is hot and plastic.

I claim:

1. A medicinal preparation comprising a shaped product of a size adapted to be taken into the mouth, containing sterilized decolorizing vegetable carbon, substantially free from soluble ash constituents, of which the dry matter contains substantially above 94% of free carbon, such material being held together by a crystalline binder which is readily soluble in the juices of the alimentary canal.

2. The herein described process of making coherent bodies containing decolorizing carbon, which consists in preparing decolorizing carbon in neutral, sterile powdered form, preparing a supersaturated solution of cane sugar or milk sugar, mixing said decolorizing carbon powder with said sugar solution while the latter is hot, and allowing the mass to cool so as to cause the sugar to crystallize and bind the carbon particles.

In testimony whereof I have signed this specification.

JOHAN NICOLAAS ADOLF SAUER.